United States Patent

Zainaleian

[11] Patent Number: 5,130,694
[45] Date of Patent: Jul. 14, 1992

[54] TIRE PRESSURE WARNING SYSTEM

[76] Inventor: Mortaza Zainaleian, 1534 Rocky Meadows Trail, Cordova, Tenn. 38018

[21] Appl. No.: 708,287
[22] Filed: May 31, 1991
[51] Int. Cl.5 .......................................... B60C 23/02
[52] U.S. Cl. ..................................... 340/442
[58] Field of Search ................... 340/442; 200/61.25, 200/61.22; 73/146.3, 146.8; 116/34 R; 136/227, 229

[56] References Cited

U.S. PATENT DOCUMENTS

| | | | |
|---|---|---|---|
| 2,731,936 | 1/1956 | Fowler | 340/442 X |
| 3,660,816 | 5/1972 | Barber | 340/442 |
| 3,693,149 | 9/1972 | Johnston | 340/442 |
| 4,487,241 | 12/1984 | Van den Merwe | 340/442 X |
| 4,646,673 | 3/1987 | Fordyce | 116/34 R |

FOREIGN PATENT DOCUMENTS

| | | | |
|---|---|---|---|
| 3806322 | 9/1989 | Fed. Rep. of Germany | 340/442 |
| 2207760 | 2/1989 | United Kingdom | 340/442 |

Primary Examiner—Jin F. Ng
Assistant Examiner—Brian R. Tumm
Attorney, Agent, or Firm—Richard C. Litman

[57] ABSTRACT

An apparatus is for sensing the presure in a vehicle's tires while the tire is revolving. Tire pressure is tapped at the valve stem. Pressurized air is passed through a delivery tube from the valve stem to a pressure sensor which detects either a too high or a too low pressure from the tire. The delivery tube passes from the valve stem over the outer face of the tire to the center of the wheel. There it enters a hole bored along the axis of rotation of the wheel and passes through the wheel and suspension parts until it reaches a free space. Here the rotating tube connects to an inner, rotary master cylinder of the sensor. The master cylinder includes a piston acted upon by the pressurized air from the tube. A spring opposes the air pressure, so that the axial displacement of the piston is proportional to the tire pressure. An electrical contact is moved by the piston; it can touch either of two stationary contacts, whose positions correspond to over pressure or under pressure, and complete circuits to light warning lamps for the driver. The master cylinder spins within an outer case which is fastened to the wheel suspension and which contains the stationary contacts.

16 Claims, 2 Drawing Sheets

TIRE PRESSURE WARNING SYSTEM

FIELD OF THE INVENTION

The present invention relates to devices for sensing tire pressure in a revolving tire.

DESCRIPTION OF THE PRIOR ART

The prior art discloses a variety of tire pressure sensing systems, which can monitor tire pressure when a vehicle is moving. Such a system is useful because tires can develop leaks while the vehicle is moving and lose pressure. This can lead to poor traction and a loss of control in an emergency. Underinflation can also cause overheating and a possible blow out. Overpressure is also a hazard, though less so. A tire which is filled with air to a proper pressure can experience a dangerous rise in pressure due to temperature changes. The ambient temperature can rise, and tires can also build up heat from being driven for a long time at high speeds and under large loads.

The problem of measuring tire pressure is difficult because the tire is rotating. The prior art has attempted to measure the tire pressure by various methods.

Doty, in U.S. Pat. No. 4,330,774, discloses the use of a stationary Hall Effect switch to respond to magnetic fields generated by a permanent magnet attached to the wheel in such a position that it sweeps by the Hall Effect switch. The magnet on the wheel is attached to a spring-loaded piston which varies its closeness to the Hall Effect switch according to the pressure in the tire. As the pressure varies, so does the closest approach of the magnet to the switch and the response of the switch. This requires electronics, and the varying radius of the magnet may through off the tire's balance.

Melton et al., in U.S. Pat. No. 4,570,152, also uses magnets to indirectly sense tire pressure. Permanent magnets are embedded in the tire and magnetic field sensors are located near the spinning tire. The permanent magnets are of a type whose field weakens when the magnet's temperature is raised. As the tire temperature rises dangerously, the sensors detect the temperature change and alert the driver. This invention requires that the magnets be embedded at the time of tire manufacture, and must be positioned very precisely.

U.S. Pat. No. 4,646,673 issued to Fordyce teaches the use of an indicator which flips out from a wheel when tire pressure in that wheel drops too far. Air from the valve stem is fed to a device on the wheel rim which flips out the indicator from a position lying flat on the wheel rim to an extended position parallel to the wheel axis. The driver can then easily see the indicator in a rear-view mirror. The invention is intended primarily for trucks. A major drawback is that the driver must stay alert and periodically check the mirrors, looking for the small indicators.

Some inventors have used radio transmitters attached to the wheel to transmit tire pressure information. This principle has obvious drawbacks in terms of ruggedness, power requirements, and interference.

Ballyns, in U.S. Pat. No. 4,890,090, discloses a flexible conductive membrane stretched across a cylindrical cavity. The membrane responds to pressure differences on either side of the membrane by distorting or bulging. An electrical contact is disposed on either side of the membrane. Thus, when the pressure differential becomes great enough, contact is made on one side or the other. The membrane is somewhat permeable so that pressure will slowly equalize on either side of the membrane. The device may be mounted on a vehicle wheel to act as a switch responding to sudden changes in tire pressure. When the contacts close, a radio transmitter send a signal to the driver. This system has the same drawbacks of other radio systems.

None of the above inventions and patents, taken either singly or in combination, is seen to describe the instant invention as claimed.

Accordingly, one object of the present invention is a tire pressure warning system which warns of either high or low pressure.

Another object is a system which requires no radio link.

These and other objects of the present invention will become readily apparent upon further review of the following specification and drawings.

SUMMARY OF THE INVENTION

The present invention is for sensing tire pressure in a revolving vehicle tire. A T-shaped tap is fitted onto the valve stem: one end of the tap is adapted to receive air from an air supply, and the other attaches to a tube. The tube runs along the outside surface of the wheel to the center of rotation.

A hole is bored through the wheel and suspension along the axis of rotation of the wheel. The tube passes into this hole and along it to a pressure sensor. The sensor contains an inner rotating part and a stationary outer housing or case which is bolted to the suspension. The inner part is cylindrical and rides on bearings within the case.

The tube conducts tire air pressure into one end of the inner cylinder, where the air pushes against a piston sliding within the cylinder. The piston is backed by a spring to counteract the air pressure. A shaft leads from the piston to a disc which can contact switches. The switches are located at extremes of the shaft's travel.

The piston area, the spring constant, and the switch positions are adjusted together so that, as the tire air pressure rises, the piston is forced back against the spring and one of the switches is closed by the moving arm. This switch is connected to light up an indicator light on the vehicle's dashboard. Conversely, if the pressure falls the other switch is closed and a second light alerts the operator.

Each tire has one sensor. On the dashboard, the tires may be indicated by individual pairs of lights, preferably shaped like arrows and pointing up or down to indicate whether the pressure is high or low; or a single pair of lights can be used, and a selector switch used to check each tire in turn. A single buzzer and/or a separate flashing lamp are used to alert the operator in case any tire's pressure falls too high or too low.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
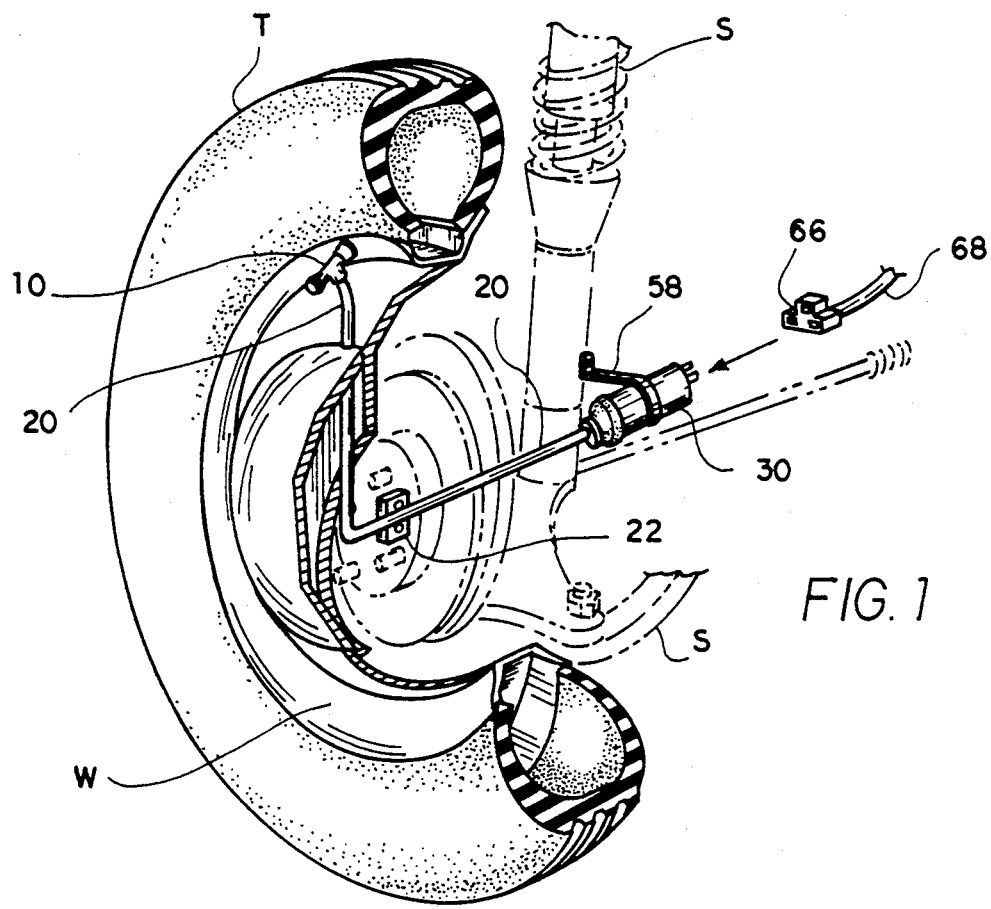
FIG. 1 is an environmental, partial cutaway and partial phantom view of the present invention attached to the front wheel of a vehicle.

The present invention is shown in overview in FIG. 1. A vehicle tire T is shown mounted upon a wheel W. The wheel W is bolted to a suspension S on which the wheel W rotates for vehicle motion.

Figure 3:
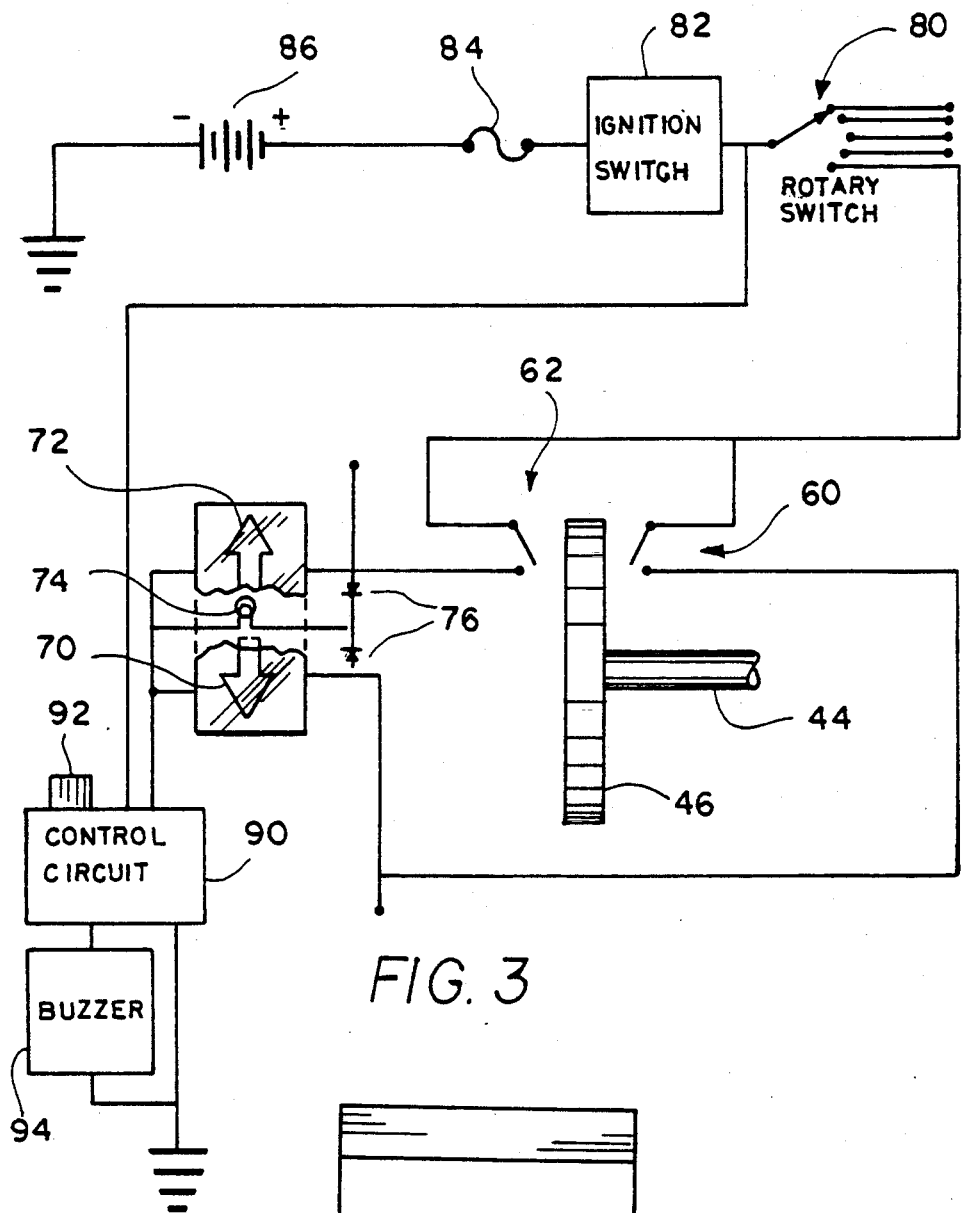
FIG. 3 shows warning lamps and a buzzer for pressure alerts.

Pressurized air within the tire T is fed through a tube 20 to a sensor 30, which detects the pressure of the air in the tube 20 and sends responsive signals to warning lights or buzzers (not shown in FIG. 1; these are shown in FIG. 3). The electrical signals are sent from the sensor 30 through a wire 68, which connects to the sensor 30 with a connector 66. A bracket 58 may be used to locate the sensor 30.

A T connector 10 is used to tap into the pressurized air within the tire T. The T connector has screw fittings on all three ends. The cross of the T contains one fitting to attach to the valve stem and to depress the central valve stem valve actuator, and another fitting for adding or releasing air from the tire through the T. The leg of the T contains a third fitting adapted to mate to the tube 20.

A ball bearing 22 may be employed in non-rotating parts of the suspension S through which the tube T runs, to prevent chafing of the rotating tube T against the walls of its passage.

Figure 2:
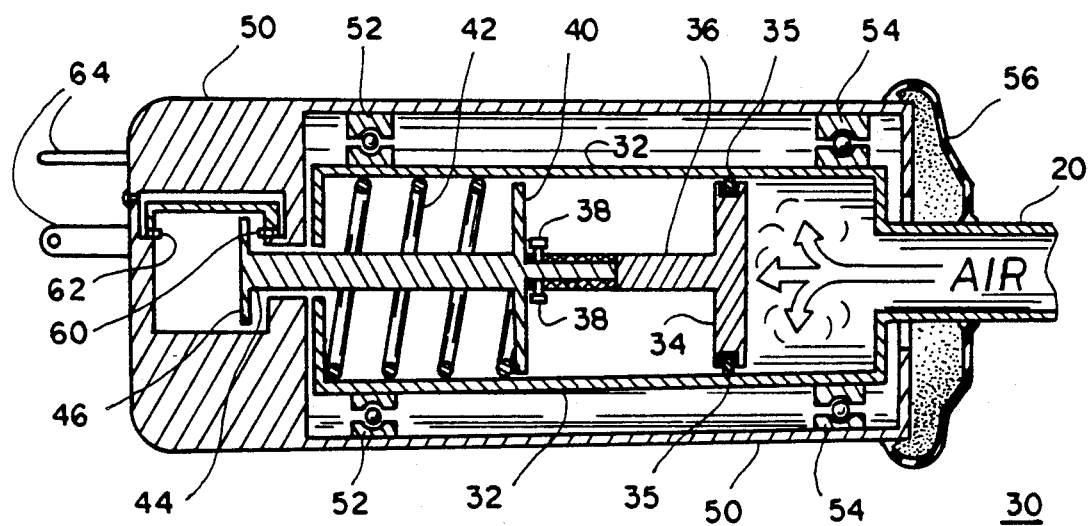
FIG. 2 is a cross section of the pressure sensor.

Referring now to FIG. 2, the sensor 30 is shown in cross section. The tube 20 joins a master cylinder 32 which is rotatably held within the cylindrical case 50 by ball bearings 52, 54. The joint between the tube 20 and the master cylinder 32 must be air-tight, for example made by sealed threads. The master cylinder 32 includes a cylindrical bore and flat end plates with openings. Within the master cylinder is a sliding piston 34 which presents an air-tight seal to the pressurized air. The piston 34 includes a piston ring or packing 35 to seal against air leaking around the edge of the piston 34. An axial rod 36 extends from the back side of the piston 34. The rod 36 has a threaded axial hole into which is screwed a threaded extension of a metal contact arm 44. The threaded engagement of the rod 36 and the arm 44 is held by lock screws 38. The rod 36 and the arm 44 together constitute a shaft.

A flange 40 is integral with the end of the rod 36. A coil spring 42 bears against the flange 40, and also against the inside of the master cylinder 32. The spring 42 urges the piston 34 towards the connection of the tube 20 to the master cylinder 32 (to the right in FIG. 2).

The space within the master cylinder 32 which is on the rear side of the piston 34 (the side to the left in FIG. 2) is at fixed pressure. This is because air is sealed within the case 50. Air cannot leak through the rubber boot 56.

The piston 34 will assume a position at which the force of the pressurized air from the tire acting on the face of the piston 34 is balanced by the force of the spring 42. The force of the spring 42 is proportional to the displacement of the piston 34 towards the spring, by Hooke's Law. Any air trapped within the case 50 will act in the same manner as does the spring. The pressure of the admitted air from the tire is, however, almost independent of the motion of the piston 34, because the volume swept out by the piston 34 is small compared to the volume of the air in the tire. To a first approximation, the pressure change is inversely proportional to the volume change of the tire air; so a small proportional change in volume implies a small proportional change in pressure. Therefore, the position of the spring 42 is proportional to pressure of the air admitted from the tire T through the tube 20.

The arm 44 ends in a metal disc 46. This disc 46 may be spinning along with the tube T and master cylinder 32 when the vehicle tire T is rolling, due to friction between the piston ring 35 and the bore of the master cylinder 32. The disc 46 makes electrical contacts to alert the driver when tire pressure falls or rises too far.

The metal disc 46 makes sliding contact with either low pressure-indicating contacts 60 or high pressure-indicating contacts 62 when the air pressure against the piston 34 falls too low or rises too high. The disc 46 and contact 60, 62 thus act as a single-pole, single-throw switch.

The contacts 60, 62 are electrically connected to prongs 64 on the outside of the case 50 which mate with the connector 66.

An alternative arrangement is to have tiny single-pole, single-throw, normally open momentary contact switches in place of the two individual contacts. Such switches might include roller arms.

Still another alternative is to have single contacts 60, 62 and to make ground connection through the case 50.

The range of pressures, which will not make either contact, is determined by the size of the piston 34, the spring constant of the spring 42, and the effective travel length of the disc 46 (the distance between the contacts 60, 62, less the thickness of the disc 46). This is the allowable range of pressure, which is set for a particular type and size of tire by the manufacturer of the sensor. The minimum and maximum pressure can be set by loosening the lock screws 38, screwing the arm 44 into or out of the rod 36, and tightening the lock screws 38.

Referring now to FIG. 3, the electrical circuit for alerting the driver to a low or high tire pressure is shown. The arm 44 moves axially in response to tire pressure, moving the disc 46 to touch either the low-pressure contacts or switch 60, or the high-pressure contacts or switch 62. The contacts 60, 62 are electrically connected to respective low- and high-pressure indicator lamps 70, 72. The lamps 70, 72 are preferably shaped as arrows to show that the pressure is low (below, pointing down), or high (above, pointing up). Visual and/or audible signals may be employed.

Power to the light the lamps comes through a rotary switch 80 which selects which tire is to be monitored. The switch 80 feeds electricity to the other various contacts 60, 62 on the respective other various tires (not shown in FIG. 3). All of the wires from all of the contacts 60 feed back through the lamp 70, and all of the contacts 62 feed back through the lamp 72. The rotary switch 80 can alternatively be replaced by a set of pushbuttons (not shown) or other equivalent.

To alert the driver, and attract his or her attention, a flashing lamp 74 is placed between the lamps 70, 72. The lamp 74 will flash, and a buzzer 94 will sound, regardless of the position of the rotary switch 80. The lamp is of the type which flashes whenever voltage is applied to it. (An ordinary bulb and flasher circuit may also be used.) In order to power the bulb when either of the two up/down indicators is powered, two diodes 76 are placed in the circuit as shown.

All three lamps 70, 72, 74 are grounded through a control circuit box 90. The circuit controls the lights and a buzzer 94 which, like the flashing lamp 74, serves to alert the driver. The circuit 90 resets whenever the ignition is turned on: the wire from the ignition switch 82 conveys the needed voltage surge when the switch 82 is closed. A reset button 92 on the circuit 90 box, if depressed once, opens the buzzer 94 circuit; if depressed again, it opens the lamp circuit, disabling the system; if depressed again, it resets both circuits to allow the driver to be alerted. The driver can thus control which mode of alert he or she desires, or shut off the system.

Figure 4:
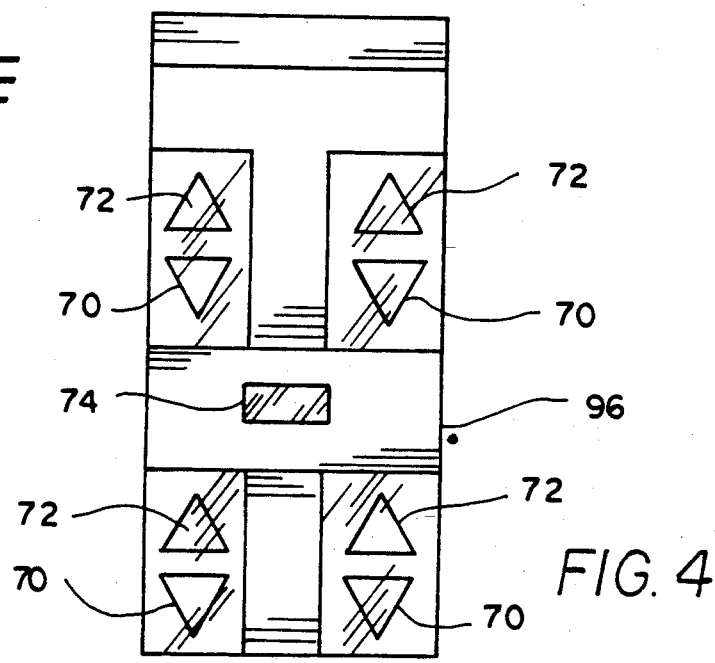
FIG. 4 depicts a dashboard display for a vehicle with four tires.

If the vehicle has six or fewer tires, a separate pair of arrow lamps can be provided for each tire, and all the contacts be powered simultaneously from a junction box; no rotary switch 80 is needed in this case. The dashboard display may have a panel 96 including lights for each tire. Such a panel 96 is shown in FIG. 4.

Referring again to FIG. 3, the electrical power is seen to be wired through the vehicle ignition switch 82. The circuit includes a fuse 84 and the vehicle battery 86.

It is to be understood that the present invention is not limited to the sole embodiment described above, but encompasses any and all embodiments within the scope of the following claims.

I claim:

1. A tire pressure sensing apparatus for detecting air pressures too high or too low in a revolving tire, comprising:
    a tire tap removably attached to a tire valve stem;
    an air delivery tube, having a first tube end attached to said tap, disposed along an outside surface of a wheel mounting the tire and through an opening in the wheel, said tube extending from the opening adjacent an axis of rotation of the tire to a second tube end;
    a cylinder pneumatically connected at a cylinder end to said second tube end of said tube;
    non-rotating case for holding said cylinder rotatably therewithin;
    a piston slidably disposed within said cylinder, said piston and said cylinder together preventing leakage of pressurized air past said piston;
    force means to urge said piston toward said cylinder end;
    a shaft coaxial with said cylinder and attached to said piston at a first shaft end; and
    electrical switching means attached to said case, said switching means including first and second electrical contact means which are responsive to axial motions of said shaft to close said first electrical contact means when said piston reaches a low pressure piston position and close said second electrical contact means when said piston reaches a high pressure piston position; and
    electrical alerting means responsive to said switching means; whereby
    a driver may be alerted to high or low pressure in the tire.

2. The invention according to claim 1, wherein said electrical alerting means includes a low pressure warning lamp and a high pressure warning lamp, and said shaft includes:
    a disc coaxial with said cylinder and attached to a second shaft end opposite said first shaft end and having a diameter greater than the diameter of said shaft;
    said first electrical contact means being disposed adjacent one face of said disc proximal said piston, said first electrical contact means effective to light said low pressure warning lamp when said piston reaches said low pressure piston position and said one face touches said first electrical contact means; and
    said second electrical contact means being disposed adjacent another face of said disc, said second electrical contact means effective to light said high pressure warning lamp when said piston reaches said high pressure piston position and said other face touches said second electrical contact means.

3. The invention as claimed in claim 2 further comprising minimum and maximum tire pressure range adjustment means which comprise means for adjusting the effective length of said shaft.

4. The invention according to claim 2, wherein said high pressure warning lamp has the shape of an upward pointing arrow and said low pressure warning lamp has the shape of a downward pointing arrow.

5. The invention according to claim 1, wherein said electrical alerting means includes an audible alert to emit a sound when said second electrical contact means or said first electrical contact means is closed.

6. The invention according to claim 1, wherein said force means includes a coil spring.

7. The invention according to claim 6 including a flange on said shaft, wherein said coil spring bears on said flange and on said case to urge said piston toward said cylinder end.

8. The invention according to claim 1 wherein said tap includes:
    stem means for removably attaching said tap to the tire valve stem;
    whereby when said tap is fitted to the tire valve stem, air may be admitted into and released from the tire and said tube and air may pass from the tire into said tube.

9. The invention according to claim 8 wherein said first tube end is removably attached to said tap.

10. The invention as claimed in claim 1 further comprising minimum and maximum tire pressure range adjustment means which comprise means for adjusting the effective length of said shaft.

11. The invention as claimed in claim 1, further comprising wiring means connecting said electrical switching means and said electrical alerting means, and electrical quick disconnect means in said wiring means.

12. The invention as claimed in claim 1 wherein a plurality of said apparatuses are provided, said plurality of apparatuses being connected to a plurality of respective tires, said electrical alerting means of each said apparatus including a low pressure warning lamp which is lit upon closing of said first electrical contact means, and a high pressure warning lamp which is lit upon closing of said second electrical contact means.

13. The invention as claimed in claim 12, further comprising additional electrical alerting means for indicating a low or high tire pressure condition in any one of the tires, separate and apart from said low and high pressure warning lamps.

14. The invention as claimed in claim 1 wherein a plurality of said apparatuses are provided, said plurality of apparatuses being connected to a plurality of respective tires, said electrical alerting means comprising a single high pressure warning lamp, a single low pressure warning lamp, and circuitry means for selectively connecting one of the plurality of said second electrical contact means to light said single high pressure warning lamp, and for selectively connecting one of the plurality of said first electrical contact means to light said single low pressure warning lamp.

15. The invention as claimed in claim 14, further comprising additional electrical alerting means for indicating a high or low tire pressure condition in any one of the tires, separate and apart from said high and low pressure warning lamps.

16. The invention as claimed in claim 1 further comprising electrical reset means for selectively, electrically enabling and disabling said electrical alerting means.

* * * * *

UNITED STATES PATENT AND TRADEMARK OFFICE
CERTIFICATE OF CORRECTION

PATENT NO. : 5,130,694
DATED : July 14, 1992
INVENTOR(S) : Mortaza Zainaleain

It is certified that error appears in the above-identified patent and that said Letters Patent is hereby corrected as shown below:

TITLE PAGE:
Item [76] Inventor:

Change "Mortaza Zainaleian"

to --Mortaza Zainaleain--

Signed and Sealed this

Nineteenth Day of January, 1993

Attest:

DOUGLAS B. COMER

*Attesting Officer*  *Acting Commissioner of Patents and Trademarks*